J. P. WOODS.
MEANS EMPLOYED IN THE CLASSIFICATION OF NAMES, &c.
APPLICATION FILED SEPT. 30, 1919.

1,343,755.

Patented June 15, 1920.
2 SHEETS—SHEET 1.

Fig. 1.

| Index | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 111 | AKS | AKS | AKS | AKS | AKS | AKS | AKS | AKS | AKS | + | AKS | AKS | AKS | + | AKS | Jr |
| 222 | BLT | BLT | BLT | BLT | BLT | BLT | BLT | BLT | BLT | # | BLT | BLT | BLT | # | BLT | # |
| 333 | C Mc U | C Mc U | C Mc U | C Mc U | C Mc U | C Mc U | C Mc U | C Mc U | C Mc U | , | C Mc U | C Mc U | C Mc U | , | C Mc U | , |
| 444 | DMV | DMV | DMV | DMV | DMV | DMV | DMV | DMV | DMV | — | DMV | DMV | DMV | — | DMV | — |
| 555 | E N W | E N W | E N W | E N W | E N W | E N W | E N W | E N W | E N W | 'S | E N W | E N W | E N W | 'S | E N W | 'S |
| 666 | FOX | FOX | FOX | FOX | FOX | FOX | FOX | FOX | FOX | & | FOX | FOX | FOX | & | FOX | & |
| 777 | GPY | GPY | GPY | GPY | GPY | GPY | GPY | GPY | GPY | Inc | GPY | GPY | GPY | Inc | GPY | Inc |
| 888 | HQZ | HQZ | HQZ | HQZ | HQZ | HQZ | HQZ | HQZ | HQZ | Ltd | HQZ | HQZ | HQZ | Ltd | HQZ | Ltd |
| 999 | IR& | IR& | IR& | IR& | IR& | IR& | IR& | IR& | IR& | * | IR& | IR& | IR& | * | IR& | * |
| 000 | J St. | J St. | J St. | J St. | J St. | J St. | J St. | J St. | J St. | . | J St. | J St. | J St. | . | J St. | . |

A — Name_____ Business_____
Place of Business_____ Residence_____

Fig. 2.

Woods, Joseph P., author Woods' System
of Compilation, r 26 Grant Pl., nw.

Inventor
Joseph P. Woods

J. P. WOODS.
MEANS EMPLOYED IN THE CLASSIFICATION OF NAMES, &c.
APPLICATION FILED SEPT. 30, 1919.

1,343,755.

Patented June 15, 1920.
2 SHEETS—SHEET 2.

Fig. 3.

| B / Index | Classification — Name — Location |  |  |  |  |  |  |  |  |  |  |
|---|---|---|---|---|---|---|---|---|---|---|---|---|
| 111 | A K S | A K S | A K S | A K S | A K S | A K S | A K S | + | A K S | A K S | A K S | + |
| 222 | B L T | B L T | B L T | B L T | B L T | B L T | B L T | # | B L T | B L T | B L T | # |
| 333 | C Mc U | C Mc U | C Mc U | C Mc U | C Mc U | C Mc U | C Mc U | , | C Mc U | C Mc U | C Mc U | , |
| 444 | D M V | D M V | D M V | D M V | D M V | D M V | D M V | — | D M V | D M V | D M V | — |
| 555 | E N W | E N W | E N W | E N W | E N W | E N W | E N W | & | E N W | E N W | E N W | & |
| 666 | F O X | F O X | F O X | F O X | F O X | F O X | F O X | 's | F O X | F O X | F O X | 's |
| 777 | G P Y | G P Y | G P Y | G P Y | G P Y | G P Y | G P Y | Ltd | G P Y | G P Y | G P Y | Ltd |
| 888 | H Q Z | H Q Z | H Q Z | H Q Z | H Q Z | H Q Z | H Q Z | Inc | H Q Z | H Q Z | H Q Z | Inc |
| 999 | I R & | I R & | I R & | I R & | I R & | I R & | I R & | * | I R & | I R & | I R & | * |
| 000 | J St. | J St. | J St. | J St. | J St. | J St. | J St. | . | J St. | J St. | J St. | . |
|  | 1 | 2 | 3 | 4 | 5 | 6 | 7 | 8 | 9 | 10 | 11 | 12 |

Fig. 4.

| C / Index | Street — House Number Name of Occupant — Business |  |  |  |  |  |  |  |  |  |  |
|---|---|---|---|---|---|---|---|---|---|---|---|
|  | Name of Street or Office Building |  |  |  |  |  |  |  | Street |  | House Number |
| 111 | A K U | A K U | A K U | A K U | A K U | A K U | A K U | A K U | 111 | N | 11111 |
| 222 | B L V | B L V | B L V | B L V | B L V | B L V | B L V | B L V | 222 | E | 22222 |
| 333 | C M W | C M W | C M W | C M W | C M W | C M W | C M W | C M W | 333 | S | 33333 |
| 444 | D N X | D N X | D N X | D N X | D N X | D N X | D N X | D N X | 444 | W | 44444 |
| 555 | E O Y | E O Y | E O Y | E O Y | E O Y | E O Y | E O Y | E O Y | 555 | ne | 55555 |
| 666 | F P Z | F P Z | F P Z | F P Z | F P Z | F P Z | F P Z | F P Z | 666 | nw | 66666 |
| 777 | G Q av | G Q av | G Q av | G Q av | G Q av | G Q av | G Q av | G Q av | 777 | se | 77777 |
| 888 | H R ct | H R ct | H R ct | H R ct | H R ct | H R ct | H R ct | H R ct | 888 | sw | 88888 |
| 999 | I S al | I S al | I S al | I S al | I S al | I S al | I S al | I S al | 999 | cor | 99999 |
| 000 | J T st | J T st | J T st | J T st | J T st | J T st | J T st | J T st | 000 | opp | #0000 |
|  | 1 | 2 | 3 | 4 | 5 | 6 | 7 | 8 | 9 | 10 | 11 |

Inventor
Joseph P. Woods

UNITED STATES PATENT OFFICE.

JOSEPH P. WOODS, OF WASHINGTON, DISTRICT OF COLUMBIA.

MEANS EMPLOYED IN THE CLASSIFICATION OF NAMES, &c.

1,343,755.   Specification of Letters Patent.   Patented June 15, 1920.

Application filed September 30, 1919. Serial No. 327,443.

*To all whom it may concern:*

Be it known that I, JOSEPH P. WOODS, a citizen of the United States, residing in Washington, in the District of Columbia, have invented new and useful Improvements in Means Employed in the Classification of Names, &c.

This invention relates to means employed in the compilation and classification of names, numbers, etc., and particularly to the compilation of classified records through the use of perforated (punched) cards or the like in conjunction with a suitable perforating machine and a suitable assorting or distributing machine.

The object of the invention is to provide novel means for use in the expeditious compilation and classification of names or the like for city or county directories, State gazetteers, classified business directories, street guides and householders' directories, office building and apartment house directories, pay rolls, tax lists, mailing lists, army rosters, etc., or for any large lists requiring alphabetical or numerical arrangement.

In carrying my invention into practice, use is made of cards laid out in information fields and adapted to be punched by a card punching machine, the keyboard of which is laid out accordingly. The cards passed through the punching machine are then assorted by passing them a required number of times through an assorting machine, whereby the cards are properly assorted or classified according to the punched information thereon. The mechanical means (perforating and assorting machines) employed may be similar to those heretofore used in similar operations. My invention, however, differs essentially from prior methods or devices used in the classification of information, the essential feature of my invention consisting in a novel formation and arrangement, upon the card, slip or sheet, of information sections or fields and the relative order and arrangement of indicating numbers, letters and symbols therein, whereby an easy, convenient and labor-saving short method of compilation for the purpose described is produced.

In the accompanying drawings illustrating certain means for carrying my invention into practical effect,—

Figure 1 is a view of a punch card of a type particularly adapted for use in the compilation of city directories, etc.

Fig. 2 is a view the type of card shown in Fig. 3, with certain field indicia omitted, showing the card punched for name shown at top and giving full copy for printer as the name would appear in the directory.

Fig. 3 is a view of a punch card generally similar to that shown in Fig. 1, but more especially adapted for use in the compilation of classified business directories.

Fig. 4 is a view of a punch card for use in the compilation of street guides or householders' directories.

Referring to the drawings, and particularly to Fig. 1, the numeral 1 designates an index card, slip or sheet of any form, size or thickness suitable for the purpose and for use in conjunction with a perforating machine and a distributing or assorting machine.

This card 1, as shown in the present instance, is provided at its top with a horizontal subdivision 2, forming a heading or name space, which is provided with appropriately designated lines or spaces to receive suitable data, such as the name, character of business, place of business and residence of the person, firm or other concern to whom or which the information on the card applies. Below this head portion or name space 2 the card is vertically subdivided to provide fields, columns or spaces containing certain indicia to be punched, and which fields, columns or spaces are laid out into determined information and delineated fields. In the present instance seventeen delineated fields are shown, the one to the extreme left being unnumbered, while the remainder are designated from one to sixteen, inclusive, such numerals appearing at the bottom portions of the delineated fields or columns. The unnumbered delineated field, above referred to, is an index delineated field containing one or more (three being shown in the present instance) columns of numerals, each consisting of the digits from one to nine, inclusive, and the cipher "0". This delineated field or column is appropriately headed by the word "Index" at the extreme left of the head portion 2 of the card and is employed for indicating numerically the most common or voluminous names, as well as names of more than ordinary length. The portion 2 of the card may also bear a suitable character, such as the letter "A", denoting the class letter of the card, that is, that this card is intended for a certain purpose, such as for use in the compilation or classification of names for city directories, etc.

The delineated fields or columns from one to nine, inclusive, constitute surname delineated fields, containing characters to be punched for designating surnames of a length not exceeding nine letters, while the fields eleven, twelve and thirteen are forename delineated fields containing characters adapted to be punched to indicate the first three letters of a given or Christian name or of a firm or company name, and the delineated field or column fifteen is a name field containing characters adapted to be punched for indicating the second initial or first letter of the middle name of an individual or for the first letter of a company name where it occurs on copy.

The delineated fields one to nine, inclusive, eleven to thirteen, inclusive, and fifteen, are similar in character, each containing in appropriately arranged columns the letters of the alphabet, the prefixes "Mc" and "St.," the character "&" and the period ".". As stated, the "Index" delineated field contains numerals adapted to be punched for names that are most voluminous, such as Smith, Brown, Jones, etc., or for an exceedingly long name, such as Breckenridge or Schneidtmueller, while the delineated fields one to nine, inclusive, contain characters adapted to be punched for the general run of surnames which are less common in number or length than those of the character above mentioned. While the number of the surname delineated fields may be varied, of course, nine delineated fields are generally found to be sufficient, as names containing more than nine letters are so comparatively few in number that it would not be necessary or economical to run the card further through an assorting machine, provision being made, however, in the delineated fields ten and fourteen for indicating when the full surname is not completely spelled out. The delineated field ten is a character field comprising a column of symbols for the general run of characters following a name such as "&," the hyphen "-," ",", "'s," "Inc.," "Ltd.," etc. This delineated field also contains the plus "+" mark, the "#" or space mark, and the "*". The delineated field or column fourteen may in all respects be similar to delineated field or column sixteen, but delineated field or column sixteen may vary therefrom as required, as by the omission of the plus mark and substitution of "Jr." or other symbols pertinent thereto. It will be understood from the foregoing that the name and other data pertaining to the person or firm to whom or which the card relates is placed in the head space 2, and that the name shown in this head space is the copy for the perforating machine operator. If this name should be an indexed name, the index number may be written above the heading index at the extreme left of the head portion 2, to serve as a guide for the punching machine operator. In punching the card on the punching machine, if the name at the top is an indexed name, the perforations in the index delineated field or column will be punched according to the index number. In such event the only other punches required on the card would be in delineated fields ten to sixteen, as called for on copy showing first name and initials. Under such conditions delineated fields one to nine, inclusive, would not be used, and would therefore be eliminated, saving time and labor in assorting the cards through the assorting machine since the cards relating to the greater volume of names would be thrown to their proper positions by the first run of the assorting machine, eliminating all further assorting action until required for the assorting of delineated fields ten to sixteen.

If, however, the name at the top of the card should not be an indexed name the delineated fields one to nine, inclusive, are employed, and there will be a punch or perforation for each letter in the name, in the delineated field, section or column corresponding with such letters, and the period will be punched in the same field in which the name ends. For example, in punching the surname Ade, the A, in delineated field one, D in delineated field two, and E in delineated field three would be punched, also the period in delineated field three, thus showing that the name was ended and would be eliminated for further assorting until required for delineated field ten. If the name contains nine letters, as Schneider, there would be a punch in each of the first nine delineated fields corresponding with the letters in their order, and the period in delineated field nine would also be punched. In the event, however, that the name contains more than nine letters, then the plus "+" sign in delineated field ten would be punched, this indicating that the name contains more than nine letters. Delineated fields eleven, twelve and thirteen contain characters which are to be punched to give the first three letters of a given or Christian name or for a company name, while delineated field fifteen is for the second initial of name or for first letter of company name where it occurs on copy. The delineated fields ten, fourteen and sixteen are to be used for perforating suffixes as required according to copy, and where no symbol is shown on copy the "#" mark or ","

should be punched in this field. The "*" may be employed as an arbitrary mark for various purposes, such as in directory classification, indicating the race or color (for instance—negro) of the person referred to. These symbols may be changed to suit the exigencies of the occasion or according to the character of the compilation of classification to be made.

It will be observed from the foregoing description that the punch card provides delineated fields each comprising one or more characters adapted to be punched to spell any name within a given range of letters, together with means whereby indication may be given whether the name is completely spelled in any delineated field or whether the length of the name exceeds the number of delineated fields and is written in a shortened or abbreviated manner. Also it will be seen that a delineated field is provided, i. e., the "index field," whereby, under certain conditions, the necessity of punching the complete name in the spelling fields is avoided and time and labor saved by punching an arbitrary number representing such name, this operation also saving subsequent time and labor in assorting the cards by means of the assorting machine. These are important features of my invention, since by the provision of means for punching cards to designate names in the manners set forth the necessity of punching out the full names throughout a vast bulk of cards will be avoided, an item of material importance in directory classification and other similar work in which a large mass of names is handled.

Another important feature incident to my invention is that the "index" field not only serves as a punch field for arbitrarily numbered names, but also as a key field or column for indicating the relationship between the characters in the punch fields upon the card and the keyboard of the punching machine. Thus, for example, there may be ten characters in each column of characters in each field, and an equivalent number of keys upon the keyboard of the punching machine, such keys being denoted from 1 to 9, inclusive, and 0 to correspond with the numerical indicia of each column of characters in the index column. The first key of the keyboard will thus be numbered 1 to correspond with the first numeral "1" in the "index column," and this numeral 1 is in transverse alinement with the first transverse row of characters "AKS" and "+" (also representing " Jr.") of the columns 10 to 16 inclusive, while numeral 2 of the index column is in alinement with the transverse row of characters " BLT " and " # " in columns 10 to 16, and so on throughout the length of the index column and the transverse rows or portions of the delineated fields 10 to 16 in transverse alinement with the respective numerals in said index column. Hence the keys of the punching machine will bear the indications shown on the keyboard in the following representation,

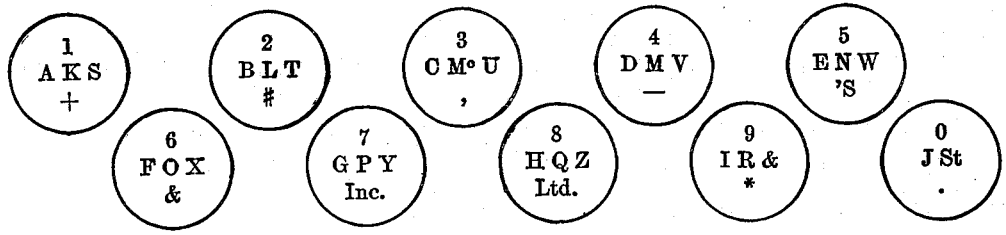

from which it will be evident that key 1 is used to punch the first transverse row of characters in all the fields, key 2 to punch the second transverse row of characters in all the fields, and so on, this arrangement insuring simplicity, ease of understanding the use of the cards and operation of the punching machine, and reducing the actual number of punch keys and punch mechanism required in a punching machine to carry out the designated work. Of course, the machine may be provided with other keys, additional to the punch keys, such as spacing keys and the like, for controlling its operation, but the character arrangement specified allows the punching mechanism to be simplified.

In Fig. 3 I have shown cards adapted to be punched for the compilation of a classified business directory. These would be practically the same as described in connection with the card shown in Fig. 1, with the exception of the index delineated field, which instead of being indexed for the individual name would be indexed for the classification under which the name should be shown, viz., artists No. 4, barbers No. 10, and shoemakers No. 111. In this card I have shown the use of a smaller number of alphabetical fields. This particular card is more especially designed for classifications with large groups of names. Therefore, only the cards required to be punched would be indexed cards; unless it was desired to combine the names under all classifications to ascertain how many times a name was duplicated, then all cards would have to be punched in alphabetical fields. Fig. 2 shows the card in Fig. 3 with head space filled in to give name and information respecting a particular person, the card being also punched to give such name and information and to supply full copy for the printer for directory compilation.

In Fig. 4 I have shown a card adapted to be used for street guide or householders' directory compilation. On this card the delineated fields would be arranged differently, their object being to show by the punches, the street, avenue, apartment or office building and the house or room number as shown on top of card. The index delineated field on this card would be for the streets or avenues having the largest number of houses, and numbered according to their alphabetical order. (The numerical streets cannot well be included in this, so, to avoid confusion, they are given a separate delineated field with numerals corresponding to those in the index delineated field. See field 9.)

The alphabetical fields on this card are for the names of all other streets, avenues, apartments or office buildings not indexed and are to be punched according to spelling of such name. If it is just an initial street ("G" st., n. w.) it would be punched G in first column, field 1, and st. in second column, same field, then in field 10 would be punched n. w.

Referring to Figs. 1 and 4, all cards having been properly punched, they are fed to the sorting machine, which is set for the index field, and all cards punched in this field will be distributed to the numbers punched and separated from the other cards. These cards are gathered in the order in which they are grouped and set aside until all the other cards have been sorted to field 9, when they will be sorted into their proper places between the other cards.

All cards not thrown out by the "index" field punches will then be run for field 1. The sorting machine having been set for this field, will sort all names beginning with A together, and so on through the alphabet. These cards will then be gathered, putting a divider between each letter.

The sorting machine will then be set for field 2, and all of the "A" cards will be run to the second letter of name as punched. If it be desirable to run the "A's" through all of the different fields before beginning on "B and C," care must be taken not to overlook the indexed names at field 10, when they should be sorted into their proper places between the other names before this field is run. After the A's have been sorted through all of the fields punched, the cards will be found in nearly final compilation and will be ready for the checker, who will sort as to occupation or business, remove all duplicates and see that all the necessary information is put upon the card retained for copy.

The street guide or householders' directory cards, shown in Fig. 4, would be run through the sorting machine according to fields, the same as the alphabetical cards, with the exception that the numerical street field or field 10, should be run next after the index field. As this will reduce the number of cards to be handled in the other fields, and if the numerical streets are compiled alphabetically, care should be taken to see that they are put in their proper place before the house numbers or field 11 is run. If apartment houses and office buildings are included in the compilation care should be taken that they are put in their proper place on the street where located. All cards having been sorted they should be ready for the street intersection cards to be inserted. A note should be made on the first and last card abutting an intersection, so that no error would be made in getting these in their proper places before giving to printer. These cards can be used from year to year, except, where a number is changed, new cards being required only for new houses or additional numbers. All changes of occupants can be written on the cards. The cards can be used as a guide to check future canvasses and to compare with alphabetical cards.

Having thus fully described my invention, I claim:—

1. A card or sheet of the character described having a series of columns of characters arranged in consecutive delineated fields and adapted to be punched to spell a name, each delineated field including a character adapted to be punched to indicate a termination of the complete spelling of the name therein.

2. A card or sheet of the character described having a series of columns of characters arranged in consecutive delineated fields and adapted to be punched to spell a name, and a character outside of and common to said delineated fields and adapted to be punched to indicate that the name is not completely spelled but exceeds the limits of said fields.

3. A card or sheet of the character described having a series of columns of characters arranged in consecutive delineated fields and adapted to be punched to spell a name, each delineated field including a character adapted to be punched to indicate a termination of the complete spelling of the name therein, and a character outside of and common to said delineated fields and adapted to be punched to indicate that the name is not completely spelled but exceeds the limits of said delineated fields.

4. A card or sheet of the character described having a series of delineated fields extending vertically in parallel relation across the card and each bearing vertical columns of characters to be punched, the characters in each row being equal in number to each other, one of said delineated fields having numbers corresponding to and constituting a key for the numbered keys of the keyboard of a punching machine, the rows of characters being arranged so that consecutive characters of the delineated fields are disposed in transverse alinement, whereby the delineated fields are divided into consecutive transverse rows the characters of which are adapted to be punched by the operation of the corresponding consecutive keys of the keyboard.

5. A card or sheet of the character described having columns of characters in different delineated fields adapted to be punched to indicate a name, and marks to be punched to indicate whether the name is completely spelled or abbreviated.

6. A card or sheet of the character described having columns of characters to be punched to spell a name, each column including the letters of the alphabet and a period mark to be punched to indicate that the name is completely spelled and concluded in said delineated field.

7. A card or sheet of the character described having columns of characters to be punched to spell a name, each column including the letters of the alphabet and a period mark to be punched to indicate that the name is completely spelled and concluded in said column, and a row of suffix characters including a character to be punched to indicate that the name has not been fully spelled out in the first named delineated fields.

8. A card or sheet of the character described provided with a delineated field comprising columns of numbers adapted to be punched to indicate arbitrarily selected and numbered names, a field comprising columns of letters of the alphabet and characters adapted to be punched to spell a name and to indicate that the spelling of the name is complete and ended in a certain column, and a mark adapted to be punched to indicate that the name has not been completely spelled out in the letter and character bearing columns.

9. A card or sheet of the character described having columns of characters arranged to provide a plurality of delineated punch fields, one of said fields comprising an index field consisting of columns of the digets from 1 to 9 inclusive and the cipher 0 adapted to be punched to designate arbitrarily numbered indexed names, and each of the others of said fields consisting of columns of the letters of the alphabet adapted to be punched to spell a name, said latter-named fields being sufficient in number for the spelling of the whole or substantial portions of names falling outside the scope of the numbered names in the range of the said index field.

10. A card or sheet of the character described having columns of characters arranged in groups to provide a plurality of delineated fields, said delineated fields being arranged in groups to provide delineated areas corresponding to the surname, given first and middle names respectively, each delineated field being adapted to have punched therefrom a character corresponding to the several letters forming the names and in consecutive order throughout the required number of the fields, and one column of each of said delineated fields having a character therein to be punched to indicate that the name is completely spelled and concluded in that particular field.

11. A card or sheet of the character described having columns of characters arranged in groups to provide a plurality of delineated fields, said delineated fields being arranged in groups to provide delineated areas corresponding to the surname, given first and middle names respectively, each delineated field being adapted to have punched therefrom a character corresponding to the several letters forming the names and in consecutive order throughout the required number of the fields, one column of each of said delineated fields having a character therein to be punched to indicate that the name is completely spelled and concluded in that particular field, and a column of suffix characters interposed between each of said delineated areas and including a character to be punched to indicate that the names have not been fully spelled in said delineated areas.

JOSEPH P. WOODS.